P. EVANS.
BAGGAGE CARRIER FOR AUTOMOBILES.
APPLICATION FILED NOV. 10, 1909.
976,561.
Patented Nov. 22, 1910.
3 SHEETS—SHEET 3.
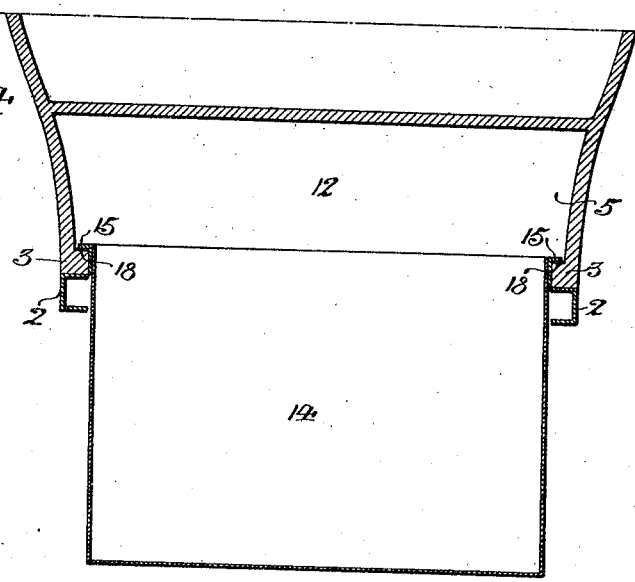
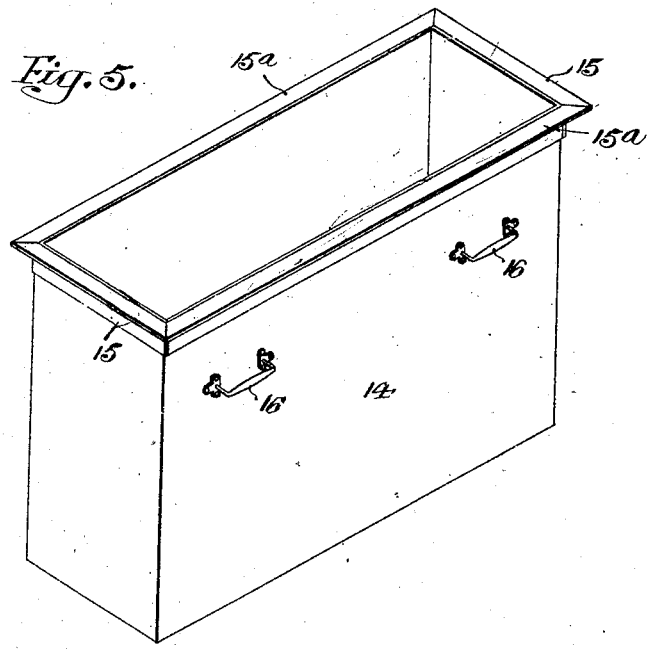
Witnesses:
Inventor:—
Powell Evans.
by his Attorneys:
Howson & Howson

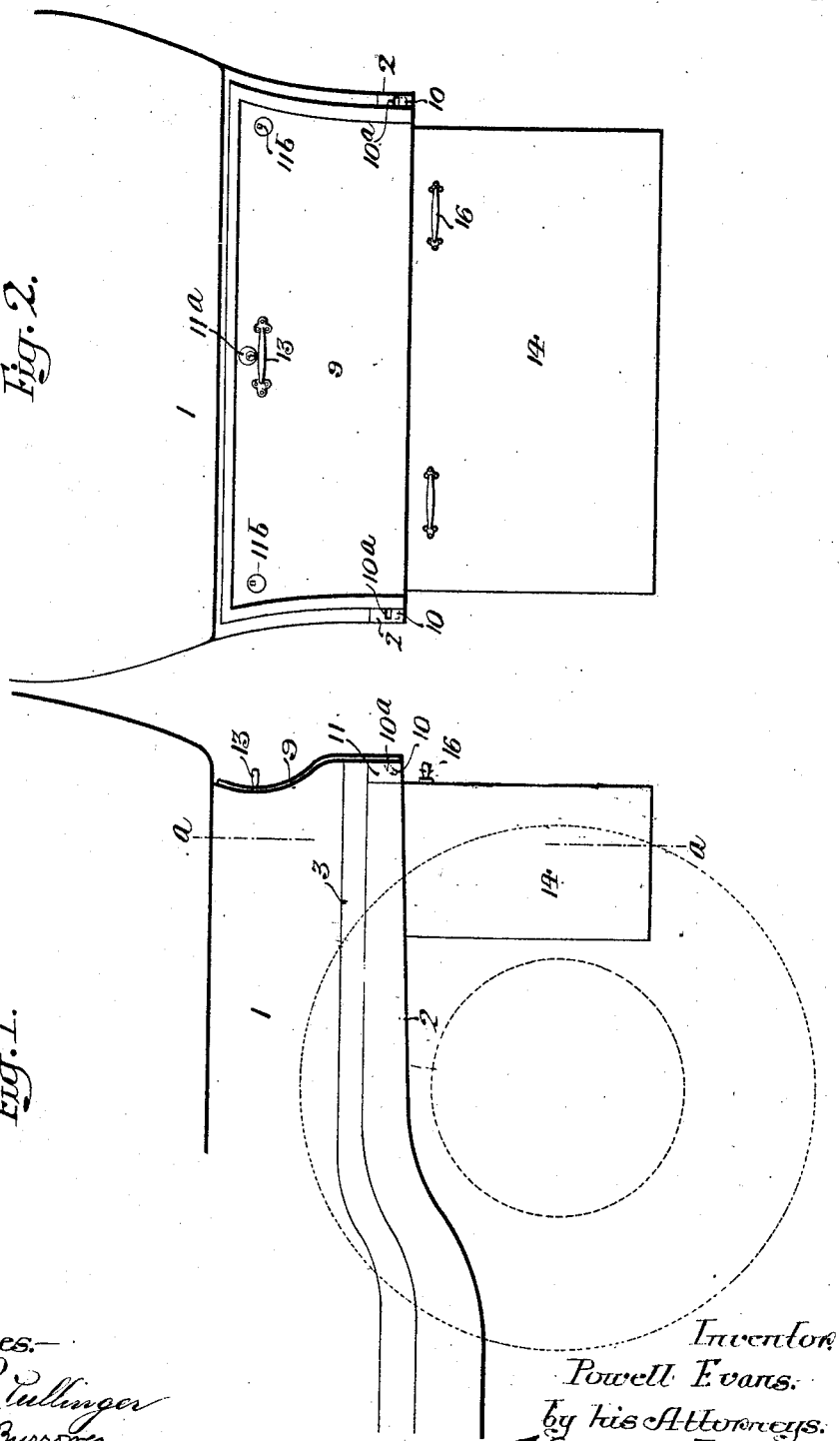

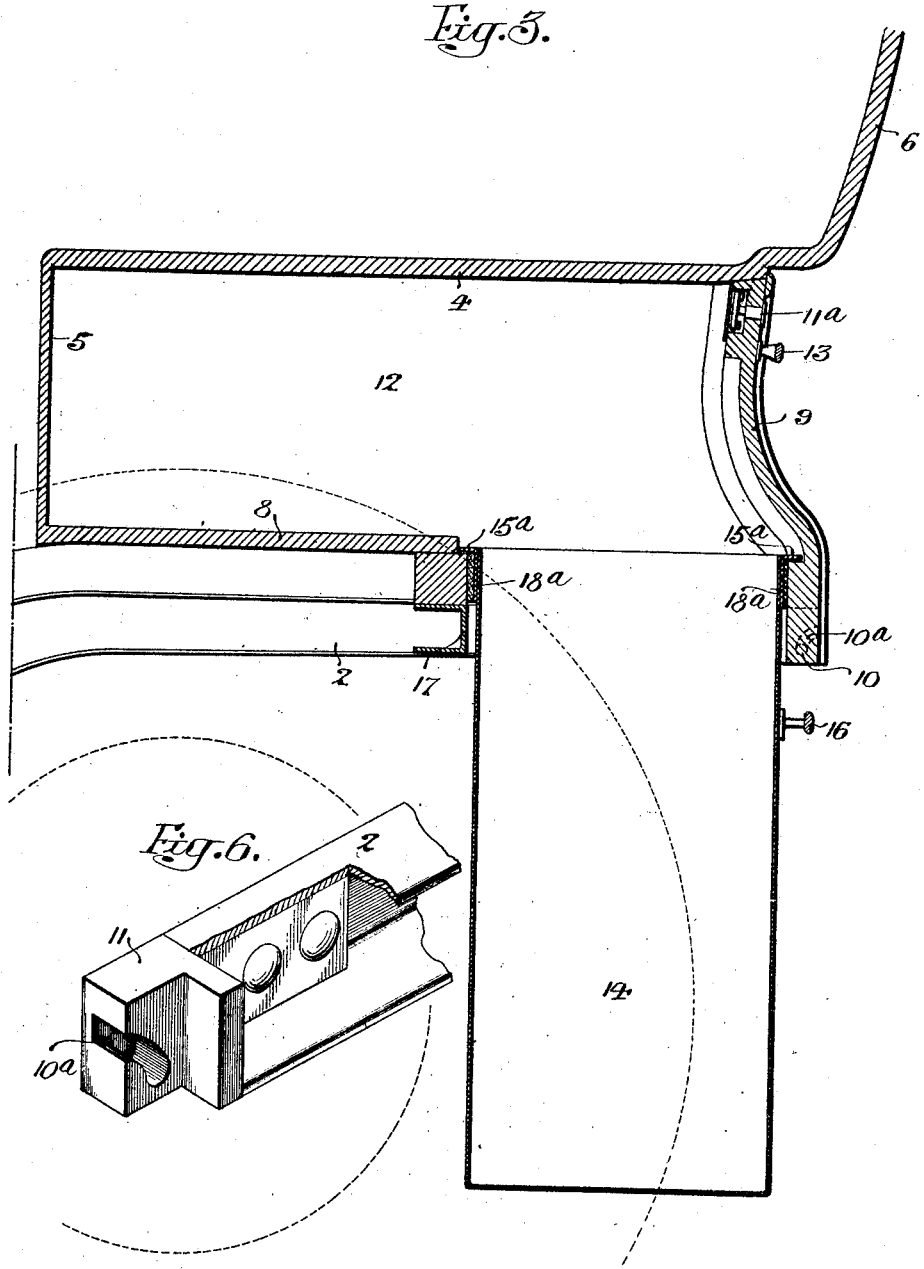

UNITED STATES PATENT OFFICE.

POWELL EVANS, OF PHILADELPHIA, PENNSYLVANIA.

BAGGAGE-CARRIER FOR AUTOMOBILES.

976,561.  Specification of Letters Patent.  Patented Nov. 22, 1910.

Application filed November 10, 1909. Serial No. 527,296.

*To all whom it may concern:*

Be it known that I, POWELL EVANS, a citizen of the United States, residing in Philadelphia, Pennsylvania, have invented certain Improvements in Baggage-Carriers for Automobiles, of which the following is a specification.

One object of my invention is to provide a construction whereby the spaces ordinarily wasted in an automobile may be utilized for carrying baggage, curtains, etc., and that without materially increasing the cost of the car or involving any radical change in the arrangement and construction of its parts.

I further desire to provide a baggage carrier for motor vehicles which shall have a plurality of compartments, so arranged and constructed as to be dust and water proof, and at the same time conveniently accessible and easily opened in order to permit of the placing or removal of their contents.

These objects and other advantageous ends I secure as hereinafter set forth, reference being had to the accompanying drawings, in which;—

Figure 1, is a side elevation of a portion of a motor vehicle, illustrating my invention as applied thereto; Fig. 2, is an end elevation of the construction shown in Fig. 1; Fig. 3, is a vertical longitudinal section on a somewhat larger scale than Fig. 1, illustrating the detail construction of my invention. Fig. 4, is a transverse vertical section on the line $a$—$a$, Fig. 1. Fig. 5, is a perspective view of the removable baggage container, and Fig. 6, is a perspective view showing the detail of the rear door support.

In the above drawings, 1 represents the body of an automobile, 2 the side members of the steel frame, and 3 the side members of the wooden frame.

As is customary, the car is provided with a rear seat formed with a horizontal portion 4 and a vertical front 5, extending at right angles to each other and projecting forwardly from the rear end 6 of the body.

The two sides of the car body, together with the seat parts 4 and 5, constitute respectively the sides, top and front of a space which I propose to utilize as a baggage container, and for this purpose I provide said space with a floor or bottom 8 and a rear door 9. This latter is provided at the lower portion of its side edges with projecting hinge pins or trunnions 10 designed to enter slots $10^a$ formed in suitable plates or castings 11 carried by the rear ends of the steel frame 2; the rear door 9 having at its top a lock $11^a$ of any desired construction, and a handle 13. If desired there may also be locks $11^b$ at each end of the door.

It will be understood that with such a construction it is possible, when the lock or locks have been released, to swing the door 9 back and down and thereafter bodily remove it. The object of such an arrangement is apparent when it is noted that below the bottom 12 of the container formed under the seat, I suspend a second baggage carrier 14, made in the form of a vertically elongated box of rectangular section formed of light sheet metal or other suitable material, and of such a width as to be capable of fitting between the opposite pairs of the frame parts 2 and 3.

To the top edges of the sides of this box I rivet or otherwise suitably attach two outwardly extending angle irons 15, which serve as runners or guides, and slide upon the top surface of the frame members 3 so as to permit of said container 14 being moved rearwardly by means of one or more handles 16 after the rear door 9 has been swung back and removed. If desired I may also employ two other flanges or angles $15^a$ at the front and rear top edges of the container.

A suitable stop to limit the forward movement of the container 14 is provided by the strut 17 which connects the rear portions of the frame 2, for it will be noted that said strut, instead of being placed between the extremities of the side frame members, is moved forwardly so as to permit of the introduction of said container 14 between said members.

In order that it may be perfectly dust and moisture proof, I place on the top surface of the members 3 strips 18 of felt or other material whereby this end is effectually attained. If desired, similar strips $18^a$ may also be placed in between the inside surface of the door 9 and the adjacent face of the container 14, as well as wherever else it may be necessary in order to prevent the entrance of water or dust.

I claim:—

1. The combination in a baggage carrier for automobiles of a car body having a seat, means co-acting with said seat to form a baggage container under the same, with a second and structurally independent container opening into and mounted under said first container.

2. The combination with a motor vehicle body of a seat, a structure co-acting therewith to form a baggage container under said seat, said structure including a rear door, and a second container suspended under the bottom of the first container, said door being placed to close the first container and retain the second container in position under said first container.

In testimony whereof, I have signed my name to this specification, in the presence of two subscribing witnesses.

POWELL EVANS.

Witnesses:
WILLIAM E. BRADLEY,
WM. A. BARR.